United States Patent
Van Phan et al.

(10) Patent No.: US 10,104,519 B2
(45) Date of Patent: Oct. 16, 2018

(54) APPARATUS AND METHOD FOR COMMUNICATIONS (75) Inventors: Vinh Van Phan, Oulu (FI); Sami Hakola, Kempele (FI); Timo Koskela, Oulu (FI)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 331 days.

(21) Appl. No.: 13/878,328

(22) PCT Filed: Oct. 8, 2010

(86) PCT No.: PCT/EP2010/065111
§ 371 (c)(1),
(2), (4) Date: Apr. 8, 2013

(87) PCT Pub. No.: WO2012/045369
PCT Pub. Date: Apr. 12, 2012

(65) Prior Publication Data
US 2013/0201957 A1 Aug. 8, 2013

(51) Int. Cl.
| | |
|---|---|
| *H04L 12/26* | (2006.01) |
| *H04W 4/70* | (2018.01) |
| *H04W 76/27* | (2018.01) |
| *H04L 29/08* | (2006.01) |
| *H04W 8/18* | (2009.01) |
| *H04W 60/00* | (2009.01) |

(Continued)

(52) U.S. Cl.
CPC ............ *H04W 4/70* (2018.02); *H04L 67/303* (2013.01); *H04W 76/27* (2018.02); *H04L 69/14* (2013.01); *H04W 8/18* (2013.01); *H04W 60/00* (2013.01); *H04W 88/02* (2013.01)

(58) Field of Classification Search
CPC ... H04W 4/005; H04W 68/02; H04W 72/042; H04L 5/0053–5/0055; H04L 43/00
See application file for complete search history.

(56) References Cited

U.S. PATENT DOCUMENTS 5,196,840 A * 3/1993 Leith .................. G06Q 20/4012
340/5.26
2004/0053619 A1* 3/2004 Kim et al. .................... 455/445
2004/0203384 A1* 10/2004 Sugikawa et al. ........... 455/41.2
(Continued)

FOREIGN PATENT DOCUMENTS

| CN | 101288051 A | 10/2008 |
|---|---|---|
| FR | 2 898 698 | 9/2007 |
| WO | WO 2009/072956 A1 | 6/2009 |

OTHER PUBLICATIONS

Shaheen et al., U.S. Appl. No. 61/289,274.*
(Continued)

*Primary Examiner* — Edan Orgad
*Assistant Examiner* — Sithu Ko
(74) *Attorney, Agent, or Firm* — Arch & Lake LLP (57) ABSTRACT

Apparatus and method for communication are provided. The method includes storing a machine type communication channel access profile of user equipment configured to utilize machine type communication with a network when the equipment has not an active connection with the network. The access profile is based on active UE contexts including serving-cell contexts of the device on the last access occasion. The access profile is synchronized between the user equipment and the network.

22 Claims, 4 Drawing Sheets (51) Int. Cl.
*H04W 88/02* (2009.01)
*H04L 29/06* (2006.01)

(56) References Cited

U.S. PATENT DOCUMENTS

| | | | | |
|---|---|---|---|---|
| 2005/0015583 | A1* | 1/2005 | Sarkkinen | H04L 12/1859 713/150 |
| 2005/0148368 | A1* | 7/2005 | Scheinert et al. | 455/561 |
| 2007/0169107 | A1 | 7/2007 | Huttunen | 717/174 |
| 2008/0209035 | A1* | 8/2008 | Barranco et al. | 709/224 |
| 2008/0298297 | A1* | 12/2008 | Orakkan | 370/316 |
| 2009/0017843 | A1* | 1/2009 | Laroia et al. | 455/458 |
| 2009/0319785 | A1* | 12/2009 | Wang et al. | 713/165 |
| 2010/0009675 | A1* | 1/2010 | Wijting et al. | 455/426.1 |
| 2010/0142538 | A1* | 6/2010 | Glover et al. | 370/400 |
| 2010/0302009 | A1* | 12/2010 | Hoeksel et al. | 340/10.1 |
| 2011/0016321 | A1* | 1/2011 | Sundaram | H04L 63/061 713/171 |
| 2011/0128911 | A1* | 6/2011 | Shaheen | 370/328 |
| 2011/0134841 | A1* | 6/2011 | Shaheen | 370/328 |
| 2011/0143712 | A1* | 6/2011 | Christensson et al. | 455/410 |
| 2011/0161660 | A1* | 6/2011 | Zhang et al. | 713/156 |
| 2011/0199905 | A1* | 8/2011 | Pinheiro et al. | 370/235 |
| 2011/0235558 | A1* | 9/2011 | Diachina et al. | 370/310 |
| 2011/0256896 | A1* | 10/2011 | Giaretta | H04W 4/00 455/509 |
| 2011/0270984 | A1* | 11/2011 | Park | H04W 4/00 709/225 |
| 2011/0274040 | A1* | 11/2011 | Pani et al. | 370/328 |
| 2011/0299492 | A1* | 12/2011 | Lee et al. | 370/329 |
| 2011/0310731 | A1* | 12/2011 | Park et al. | 370/230 |
| 2012/0004003 | A1* | 1/2012 | Shaheen | H04W 4/005 455/509 |
| 2012/0030358 | A1* | 2/2012 | MacKenzie | 709/226 |
| 2012/0040700 | A1* | 2/2012 | Gomes et al. | 455/500 |
| 2012/0213185 | A1* | 8/2012 | Frid | 370/329 |
| 2012/0314866 | A1* | 12/2012 | Horneman | H04W 12/04 380/270 |
| 2013/0100895 | A1* | 4/2013 | Aghili | H04W 4/00 370/329 |

OTHER PUBLICATIONS

U.S. Appl. No. 61/329,392, filed Apr. 29, 2010.*
U.S. Appl. No. 61/320,610, filed Apr. 2, 2010.*
U.S. Appl. No. 61/316,596, filed Mar. 23, 2010.*
"Machine-to-Machine communications (M2M); Functional Architecture"; Draft ETSI TS 102690 V0.0.6; Sep. 2009; whole document (15 pages); ETSI.
China Telecom; "A Proposal on initiating a new work item of Service requirements for Machine-oriented Communications"; NGN-GSI-C715-E—Aug. 2010; whole document (20 pages); International Telecommunication Union, Telecommunication Standardization Sector.
Chen, Y. et al., "Cellular Based Machine to Machine Communication with Un-Peer2Peer Protocol Stack", Vehicular Technology Conference Fall (VTC 2009—Fall), 2009 IEEE, 2o0-23 Sep. 2009, 1 pg., Abstract only.

* cited by examiner

APPARATUS AND METHOD FOR COMMUNICATIONS

FIELD

The exemplary and non-limiting embodiments of the invention relate generally to wireless communication networks and, more particularly, to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE) Release 8. An improved version of the Long Term Evolution radio access system is called LTE-Advanced (LTE-A). The LTE and LTE-A are designed to support various services, such as high-speed data.

In modern communication and computer networks, data exchange between programs and computers is a vital element. Different programs, computers and processors exchange data without human intervention. The number of devices or machines requiring cellular access without user activity will greatly increase in the future. Examples of such devices or machines include smart meters and sensors. These kinds of machines are stationary and may require only limited communication features.

In 3GPP a new device class has been proposed to describe for such machine-type communications (MTC) which has very limited set of features like supporting only few modulation and coding schemes, no mobility and few frequency bands, for example.

The stationary devices utilising machine-type communication may require network access on regular basis and are basically always (or very large proportion of their operation time) connected to same base station or eNodeB. Although they need seldom network access, the time period between the consecutive access attempts may vary quite much. In current LTE system, when user equipment which is connected to a base station or a eNodeB but has been inactive for long time is moved from a state with radio resource connection (RRC_CONNECTED) to an idle state (RRC_IDLE). This means that during the next connection attempt the user equipment has to perform RRC Connection Establishment procedure again. This is acceptable or natural when the user equipment is moving without a firm knowledge that when (and to what cell) the next connection attempt may occur: the user equipment context is released from the last serving eNodeB. However, MTC traffic characteristics may be such that a stationary device may send only few hundred bits at a time or per each access and then stay inactive for a long time. Thus a device may send several small packets at very random intervals. Between consecutive transmission occasions it may go into RRC_IDLE and it would have to go through the full RRC Connection Establishment procedure again for just to transmit again few hundred bits. As a result, transmitting small amount of information requires lots of signalling and protocol overhead in MTC.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: at least one processor and at least one memory including a computer program code, the at least one memory and the computer program code configured to, with the at least one processor, cause the apparatus at least to: store a machine type communication channel access profile of user equipment configured to utilise machine type communication with a network when the equipment has not an active connection with the network, wherein the access profile is based on active user equipment contexts including serving-cell contexts of the device on the last access occasion, and synchronise the access profile between the user equipment and the network.

According to another aspect of the present invention, there is provided a method comprising: storing a machine type communication channel access profile of user equipment configured to utilise machine type communication with a network when the equipment has not an active connection with the network, wherein the access profile is based on active user equipment contexts including serving-cell contexts of the device on the last access occasion, and synchronising the access profile between the user equipment and the network.

According to an aspect of the present invention, there is provided user equipment in a communication network, comprising: at least one processor and at least one memory including a computer program code, the at least one memory and the computer program code configured to, with the at least one processor, cause the apparatus at least to: store machine type communication channel access profile of user equipment configured to utilise machine type communication with a network when the equipment has not an active connection with the network, wherein the profile is based on active user equipment contexts including serving-cell contexts of the device on the last access occasion, and synchronise the access profile between the user equipment and the network.

According to another aspect of the invention, there is provided a computer program embodied on a distribution medium, comprising program instructions which, when loaded into an electronic apparatus, control the apparatus to: store machine type communication channel access profile of user equipment configured to utilise machine type communication with a network when the equipment has not an active connection with the network, wherein the access profile is based on active user equipment contexts including serving-cell contexts of the device on the last access occasion, and synchronise the access profile between the user equipment and the network.

LIST OF DRAWINGS

Embodiments of the present invention are described below, by way of example only, with reference to the accompanying drawings, in which.

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any network element, node, base station, server, corresponding component, and/or to any communication system or any combination of different communication systems that support required functionalities. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1A:
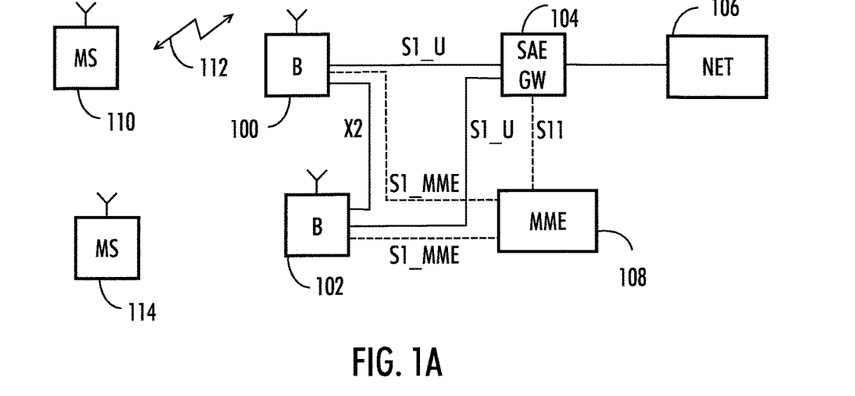
FIG. 1A shows a simplified block diagram illustrating an example of a system architecture.

With reference to FIG. 1A, let us examine an example of a radio system to which embodiments of the invention can be applied. In this example, the radio system is based on LTE network elements. However, the invention described in these examples is not limited to the LTE radio systems but can also be implemented in other radio systems.

A general architecture of a communication system is illustrated in FIG. 1A. FIG. 1A is a simplified system architecture only showing some elements and functional entities, all being logical units whose implementation may differ from what is shown. The connections shown in FIG. 1A are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The exemplary radio system of FIG. 1A comprises a service core of an operator including the following elements: an MME (Mobility Management Entity) 108 and an SAE GW (SAE Gateway) 104. It should be appreciated that the communication system may also comprise other core network elements besides SAE GW 104 and MME 108.

Base stations that may also be called eNodeBs (Enhanced node Bs) 100, 102 of the radio system may host the functions for Radio Resource Management: Radio Bearer Control, Radio Admission Control, Connection Mobility Control, Dynamic Resource Allocation (scheduling). The MME 108 is responsible for distributing paging messages to the eNodeBs 100, 102. The eNodeBs are connected to the SAE GW with an S1_U interface and to MME with an S1_MME interface. The eNodeBs may communicate with each other using an X2 interface. The SAE GW 104 is an entity configured to act as a gateway between the network and other parts of communication network such as the Internet 106, for example.

FIG. 1A shows user equipment 110 and user equipment 114 being in the area of the eNodeB 100. In this example, the user equipment refers to a computing device or machine capable of machine-type communication (MTC). The device is capable of connecting 112 to the network without user interaction, for example on given predetermined time instants, or as a response to some external event, or if paged by the network. The user equipment may be any kind of device or machine such as a smart meter, a sensor, or it may act as a gateway to the network for sensor or sensors which may operate on short range radios and thus may not have a way to connect to the network on their own.

FIG. 1A only illustrates a simplified example. In practice, the network may include more base stations and more cells may be formed by the base stations. The networks of two or more operators may overlap, the sizes and form of the cells may vary from what is depicted in FIG. 1A, etc.

The embodiments are not restricted to the network given above as an example, but a person skilled in the art may apply the solution to other communication networks provided with the necessary properties. For example, the connections between different network elements may be realized with Internet Protocol (IP) connections.

Figure 1B:
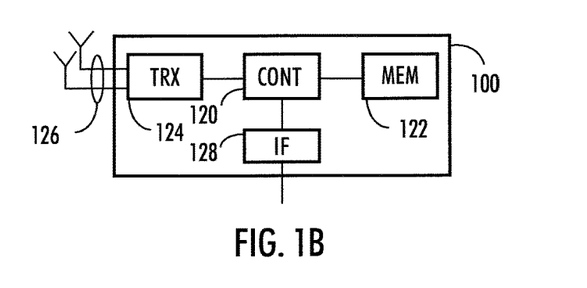
FIG. 1B illustrates an example of an eNodeB.

FIG. 1B illustrates examples of an eNodeB. The eNodeB 100 comprises a controller 120 operationally connected to a memory 122 and a transceiver 124. The controller 120 controls the operation of the base station. The memory 122 is configured to store software and data. The transceiver 124 is configured to set up and maintain a wireless connection to user equipment within the service area of the base station. The transceiver 124 is operationally connected to an antenna arrangement 126. The antenna arrangement may comprise a set of antennas. The number of antennas may be two to four, for example. The number of antennas is not limited to any particular number.

Figure 1C:
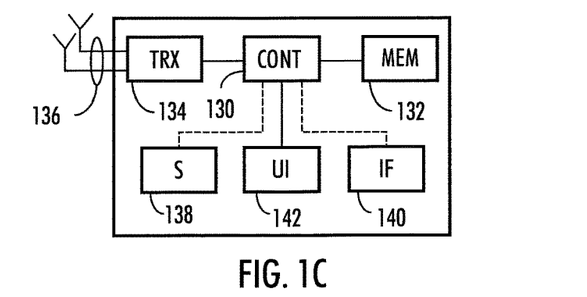
FIG. 1C illustrates an example of user equipment.

The base station may be operationally connected to other network elements of the communication system. The network element may be an MME (Mobility Management Entity), an SAE GW (SAE Gateway), a radio network controller (RNC), another base station, a gateway, or a server, for example. The base station may be connected to more than one network element. The base station 100 may comprise an interface 128 configured to set up and maintain connections with the network elements. FIG. 1C illustrates examples of user equipment 110. The user equipment 110 comprises a controller 130 operationally connected to a memory 132 and a transceiver 134. The controller 130 controls the operation of the user equipment. The memory 132 is configured to store software and data. The transceiver 134 is configured to set up and maintain a wireless connection to an eNodeB. The transceiver 134 is operationally connected to an antenna arrangement 136. The antenna arrangement may comprise a set of antennas. The number of antennas may be one to four, for example. As with the eNodeB, the number of antennas is not limited to any particular number.

In this example, the user equipment 110 refers to a computing device or machine capable of machine-type communication (MTC). The memory 132 may comprise software, which, when executed by the controller 130, enable the device to connect to the network and communicate with the network without user interaction.

In an embodiment, the user equipment 110 may further comprise at least one sensor or meter 138 operationally connected to the controller 130. The sensor may measure temperature, humidity, brightness, movement, electric or power consumption or any other measurable variable or object.

In an embodiment, the user equipment 110 may act as a gateway to the network for sensor or sensors. In such a case, the user equipment may comprise an interface 140 configured to set up and maintain connections with the sensor or sensors. The connections may be wired or wireless. Wireless connections may utilise a short range radio technique, such as Bluetooth® or any other suitable method.

The user equipment may comprise a user interface 142, for example a display.

Figure 1D:
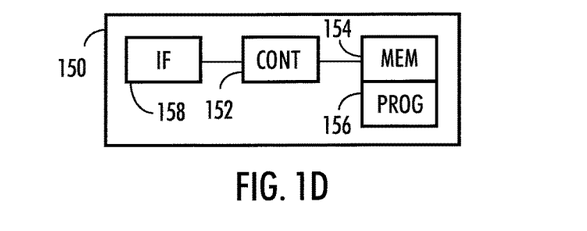
FIG. 1D illustrates an example of an apparatus according to an embodiment of the invention.

FIG. 1D illustrates an example of an apparatus 150 according to an embodiment of the invention. The apparatus, which may be denoted as Machine Type Communication Profile Function (MTCPF), may be a separate server or functionality in the network. In an embodiment, the apparatus is located in the MME 108. In an embodiment, the apparatus is located in the eNodeB 100.

The apparatus 150 comprises at least one controller 152 operationally connected to at least one memory 154. The controller 152 controls the operation of the user equipment. The memory 154 is configured to store software or computer program code 156 and data. The apparatus 150 may comprise an interface 158 configured to set up and maintain connections with the network elements of the network.

The controller 152 with the at least one memory 154 and the computer program code may be configured to cause the apparatus at least to store machine type communication channel access profile of user equipment configured to utilise machine type communication with a network when the equipment has not an active connection with the network.

Figure 2A:
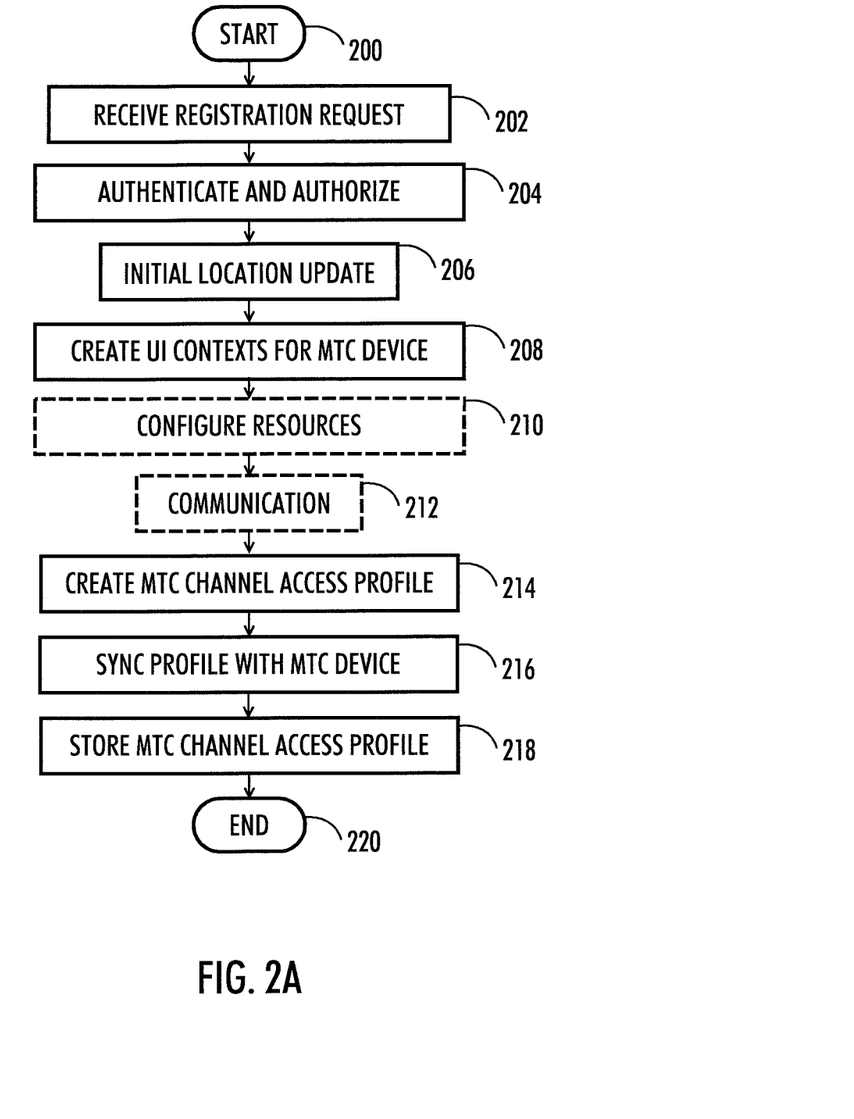
FIGS. 2A and 2B are flow charts illustrating embodiments of the invention.

FIG. 2A is a flow chart illustrating an embodiment. The flow chart illustrates an example where a MTC channel access profile is created for a MTC device when the device is first powered up. The example starts at step 200.

In step 202, an eNodeB 100 receives a registration request from a MTC device which has been power up for the first time. The device is configured to access the eNodeB serving the area the device is located.

In step 204, the network authenticates the MTC device and authorises the device to communicate in the network. These procedures are known in then art. The MTC is registered into the network.

In step 206 initial location update is performed.

In step 208, user equipment device contexts are created for the device. The MTC device may have indicated the capabilities of the device to the network and this information is utilised when creating the UE contexts.

In step 210, the network may also configure resources for the MTC device to send the data for the first time. The device may be configured to send first MTC data to an associated MTC third party server.

In step 212, the possible communication takes place.

In step 214, the network creates the initial MTC channel access profile of the device. The information stored in the profile may comprise the user equipment identities, serving-cell identities and system information, time and status of the network connection, timing advance information, used transmit power, security related data and channel allocation information, for example.

In step 216, the MTC channel access profile of the device stored in the network is synchronised with the MTC device which is configured to store the profile as well.

In step 218, the network stores the MTC channel access profile into the MTCPF server 150. The MTCPF is configured to store the MTC channel access profile of the MTC user equipment even when the equipment has not an active connection with the network.

The process ends in step 220.

Figure 2B:
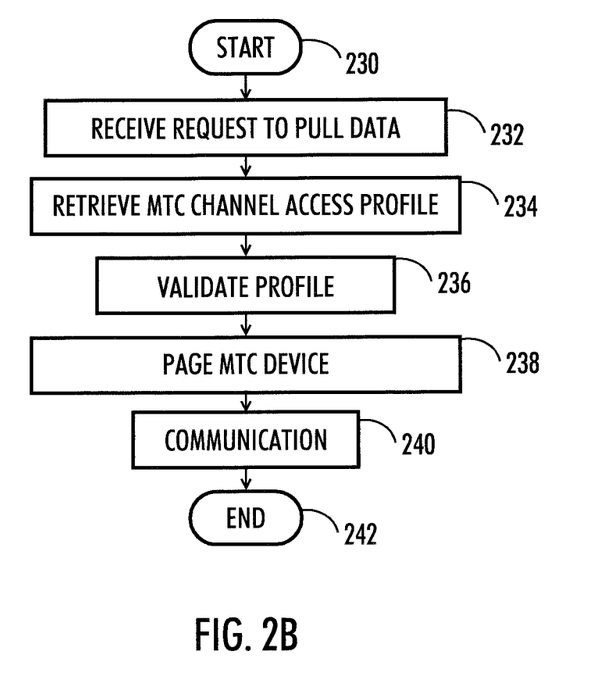

FIG. 2B is another flow chart illustrating an embodiment. In this example, a third party server requests information from a MTC device 110. The example stars at step 230.

In step 232, the network receives a request from a third party server to pull data from a MTC device.

In step 234, the network retrieves the MTC channel access profile of the MTC device from the MTCPF server 150.

In step 236, the network determines whether the profile is still valid. For example, the network may determine whether the channel used by the MTC device during previous access is available. The network may update the MTC channel access profile if needed. This may be performed by the MME 108 and the eNodeB 100 with which the MTC device has communicated during the previous access. As the MTC channel access profile comprises information on the timing advance and the channel allocation information, the connection establishment requires much less signalling and processing compared to a full RRC connection establishment. For example, Random Access Channel (RACH) procedures may be avoided in subsequent access occasions. The connection establishment including necessary bearer setup and resource allocation may be performed on the basis of the MTC Channel access profile.

In an embodiment, there may be a set of semi-static channels specified for MTC traffic within the cell served by the eNodeB 100. The channels may be identified by index 1, . . . , M, for example. The network may assign one these MTC channels to a MTC device using the index of that channel. The MTC Channel access profile may comprise information on the channel used by the MTC device during previous communication.

Each channel specified for MTC traffic may be preallocated to more than one MTC device. Typically, the communications of each device occur seldom and the duration of each communication is short. The base station may prevent simultaneous communication attempts. In addition, the preallocated channels may naturally be used for normal traffic.

The preallocated MTC channel index may be included in the paging record of the device. In case a preallocation of a MTC channel is not found in paging record, a normal memoryless channel access with RACH procedure may be carried out. The MTC channel access profile may be then updated with the channel information in addition to the time and status of the recent successful access, timing advance and transmit power. In LTE, Cell-Radio Network Temporary Identifier C-RNTI may be considered as a part of preallocation or memory channel access profile if needed.

In an embodiment, the MTCPF may keep a random number generator which is synchronised with a random number generator kept by user equipment configured to utilise machine type communication with a network. The MTCPF may use the latest generated number, which may be stored in the channel access profile of the MTC device and a preconfigured PIN (personal identification number) code to generate a ciphering key which is used to encrypt the communication between the device and the network.

In an embodiment, context aware paging may be used. The MME 108 may be configured to page the MTC device via the serving eNodeB 100 to initiate communication. The MME may be configured to inform the eNodeB of the previous channel access profile of the machine. It may be up to the eNodeB to determine whether to page the device 110 with a pre-allocated channel or not. For instance, in the case the MME and eNodeB may determine that there is no notable change in the basic cell-configuration since the last access, the eNodeB may allow the MTC device 110 to transmit right away using the previous channel access profile stored at the device with possible update of the pre-allocated channel and without the need of perform RACH for initial uplink synchronization. One of the benefits of the context aware paging is that the MME 108 does not need to send paging message to each eNodeB in the tracking area but ideally can be sent only to one eNodeB, thus reducing the traffic in the core network. Further benefits include that the paging record may be extended to indicate or allocate specific control information or dedicated resources to the device being paged, as proposed.

In step 238, the eNodeB 100 pages the MTC device. Upon receiving this context-aware paging message, the MTC device may know whether the stored MTC access profile needs to be updated with any new information or allocation and whether it can be applied or utilized for the access in response to the paging request. If the profile needs updating, the same updates are made in the network and in the MTC device. In this example, we may assume for the sake of simplicity that the profile does not need updating.

In step 240, the communication takes place. The communication may be encrypted.

In step 242, the process ends.

The above steps may be performed by the eNodeB 100 and at least in part by other network elements such as the MME 108 and MTCPF 150 of the participating network.

Figure 3A:
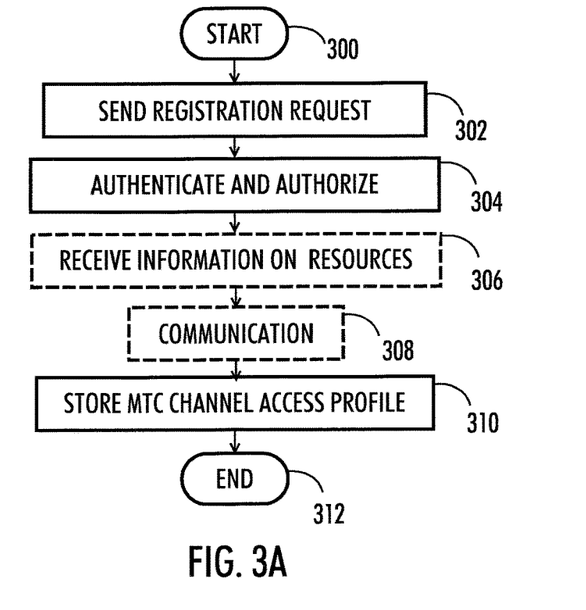
FIGS. 3A and 3B are flow charts illustrating further embodiments of the invention.

FIG. 3A is a flow chart illustrating an embodiment. The flow chart illustrates an example where a MTC channel access profile is created for a MTC device when the device is first powered up. The example starts at step 300.

In step 302, the MTC capable device 110 is powered up. The device is configured to detect the eNodeB serving the area and send a registration request to the eNodeB.

In step 304, the authentication, authorization and initial location update is performed with the network.

In step 306, the MTC device receives information on the resourced allocated for a connection with the network.

In step 308, communication takes place. The MTC device may be configured to send data to a third party MTC server in the network.

In step 310, the communication is about to end. The device is configured to store the machine-type communication channel access profile of user equipment into memory. The profile contents are synchronised with the network so that the information is stored at both ends. The information stored in the profile may comprise the user equipment identities, serving-cell identities and system information, time and status of the network connection, timing advance information, used transmit power, security related data and channel allocation information, for example.

The procedure ends in step 312.

Figure 3B:
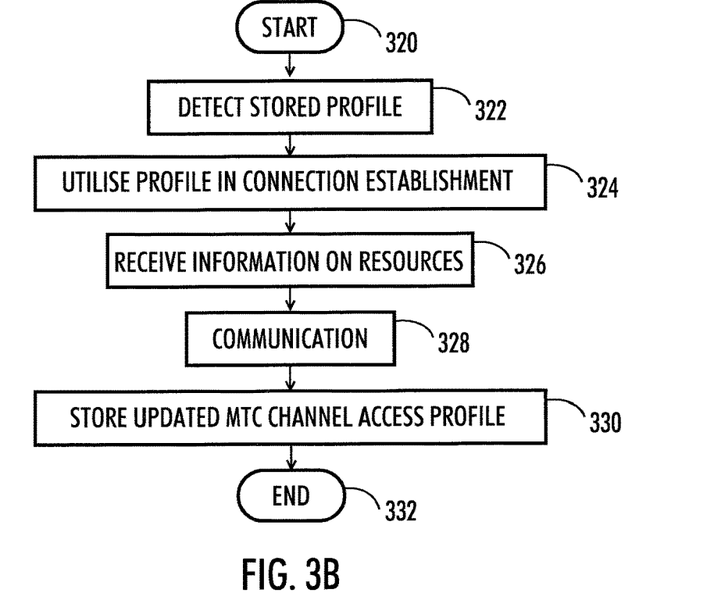

FIG. 3B is a flow chart illustrating another embodiment with a machine initiated connection set up. The example stars at step 320 where the MTC device requires a connection with the network. Typically, the device is in RRC IDLE state.

In step 322, the MTC capable device 110 detects that a MTC channel access profile is stored in the memory of the device.

In step 324, the MTC device reads the profile and the profile is utilised in the connection establishment. the MTC device performs a regular RACH procedure and sends a RRC connection establishment request. The MTC capability and the existence of profile are indicated to the network to speed up the convection establishment.

In step 326, the MTC device receives information on resources to utilise during communication. The information may be used to update the MTC channel access profile in the device.

For example, if the profile indicates a preallocation of a MTC channel, the use of the channel may be indicated to the device by the network using dedicated signalling.

In an embodiment, the device comprises a random number generator synchronised with a random number generator kept by the MTCPF in network. The device may store information on the latest generated number and preconfigured PIN code, and generate a ciphering key utilising the generator, and the PIN code, and utilise the generated ciphering key for encrypting and decrypting data transmitted between the network and the user equipment.

The suggested solution enables the use of autonomous and light bearer setup or re-establishment at subsequent occasions with enhanced security.

In step 328, the communication between the user equipment and the eNodeB is performed.

In step 330, the communication is about to end. The device is configured to update the machine-type communication channel access profile of user equipment in the memory.

The procedure ends in step 332.

A MTC device may keep several MTC channel access profiles: each specific to a serving eNodeB or a selectable cellular operator network found nearby.

In an embodiment, the MTCPF 150 may act as a synchronized network-peer of the MTC capable device. The MTCPF 150 may trigger autonomous scheduling of network paging for the device's access at subsequent occasions for pulling data and terminate the short messages containing small amount of data. Thus, the MTCPF storing a MTC channel access profile of a given MTC device may request the MME 108 of the network to page the MTC device for sending data. In addition, the MTCPF may trigger the serving eNodeB 100 to page the device 100 in a secured fashion to assign Cell-Radio Network Temporary Identifier C-RNTI, dedicated RACH preamble or resource for the device to get quick access or just schedule for the device if the last uplink synchronization may still be used. Let us consider a data transmission example in an LTE network. A MTC message may be sent as a Non-Access Stratum (NAS) message to MME using a signalling radio bearer (SRB) type of radio bearer (and then MME may forward the MTC message to MTCPF server or a third-party server). In this embodiment, setting up of any user-plane bearer service is avoided and therefore protocol overhead is reduced and resources saved. Other options include sending the MTC message as a control-plane message to the eNodeB which may be configured to forward it to the MTCPF server. in addition, the MTC message may be sent as a user-plane data on a pre-configured and pre-allocated channel. To enhance security for MTC, authentication and security configuration for MTC may be simplified using authentication configuration from the MTCPF server, instead of that from Home Registration Server. For instance, the MTCPF and each MTC device under its service may keep a synchronized security random generator as described above. When pulling data of a given MTC device, the MTCPF server may request the MME 108 and provide the MME with the security information such as the random generator output and a session PIN code. The MME then indicates the session PIN code to the MTC device via the serving eNodeB, for example in a paging record or other RRC message. The MTC device 110 may then use the received PIN code together with the random generator to derive a correct ciphering key for NAS and MTC and confirm the authentication to the MME 108.

The steps, signalling messages and related functions described above and in the attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
at least one processor and at least one memory including a computer program code, the at least one memory and the computer program code configured to, with the at least one processor, cause the apparatus at least to:
retrieve by a network node from a cellular network, a channel access profile of a user equipment wherein the channel access profile is based on an active user equipment contexts including serving-cell contexts of the user equipment obtained by the cellular network during an active connection between the user equipment and the cellular network;
synchronize, by the network node, the channel access profile between the user equipment and the cellular network; and
perform at a subsequent time, by the network node while there is no active connection between the user equipment and the cellular network, a connection establishment procedure for a machine type communication to establish a connection between the user equipment and the cellular network based on the synchronized channel access profile, wherein the connection establishment procedure comprises performing bearer setup and resource allocation on the basis of the channel access profile of the user equipment.

2. The apparatus of claim 1, wherein the channel access profile comprises at least one of equipment identities, serving-cell identities and system information, time and status of a previous cellular network connection, timing advance information, transmit power used during a previous cellular network connection, and channel allocation information.

3. The apparatus of claim 1, wherein the channel access profile comprises information on a traffic channel utilised by the user equipment.

4. The apparatus of claim 3, wherein the information on the channel comprises an index identifying a given channel pre-allocated to machine type communication traffic.

5. The apparatus of claim 1, wherein the apparatus is part of a network element of the cellular network.

6. The apparatus of claim 5, further comprising
a random number generator synchronized with a random number generator kept by the user equipment, wherein the at least one memory including the computer program code is configured with the at least one processor to cause the apparatus to:
store information on a latest generated number and pre-configured PIN code, and generate a ciphering key utilizing the random number generator, and the PIN code; and
forward the generated ciphering key to the cellular network for encrypting and decrypting-data transmitted between the cellular network and the user equipment.

7. The apparatus of claim 5, wherein the at least one memory and the computer program code are configured, with the at least one processor, to cause the apparatus to:
receive a request from another network element regarding the stored information, and send the requested information.

8. The apparatus of claim 5, wherein the at least one memory and the computer program code are configured, with the at least one processor, to cause the apparatus to:
trigger a base station to page the user equipment with an encrypted message.

9. The apparatus of claim 5, wherein the at least one memory and the computer program code are configured, with the at least one processor, to cause the apparatus to: request a connection to the user equipment on a basis of a pre-determined schedule.

10. The apparatus of claim 5, wherein the at least one memory including the computer program code is configured with the at least one processor to cause the apparatus to:
receive encrypted data from the user equipment;
decrypt the data and forward the data to the cellular network.

11. User equipment in a cellular network, comprising:
at least one processor and at least one memory including a computer program code, the at least one memory and the computer program code configured to, with the at least one processor, cause the user equipment at least to:
synchronize via a network node of the cellular network a channel access profile of the user equipment with the cellular network, wherein the synchronized channel access profile is stored at the network node, and wherein the channel access profile is based on an active user equipment contexts including serving-cell contexts of the user equipment obtained during an active connection between the user equipment and the cellular network; and
perform at a subsequent time via the network node, while there is no active connection between the user equipment and the cellular network, a connection establishment procedure for a machine type communication to establish a connection between the user equipment and the cellular network based on the synchronized channel access profile, wherein the connection establishment procedure comprises performing bearer setup and resource allocation on the basis of the channel access profile of the user equipment.

12. The user equipment of claim 11, wherein the channel access profile comprises at least one of equipment identities, serving-cell identities and system information, time and status of a previous cellular network connection, timing advance information, transmit power used during a previous cellular network connection, and channel allocation information.

13. The user equipment of claim 11, wherein the user equipment further comprises
a random number generator synchronized with a random number generator kept by the cellular network, wherein the at least one memory including the computer program code is configured with the at least one processor to cause the user equipment to:
store information on a latest generated number and preconfigured PIN code;
generate a ciphering key utilizing the random number generator, and the PIN code; and
utilize the generated ciphering key for encrypting and decrypting data transmitted between the cellular network and the user equipment.

14. The user equipment of claim 11, wherein the user equipment is configured to receive from a base station updated channel access information and a permission to send data using the stored channel access information.

15. A method comprising:
retrieving, by a network node from a cellular network a channel access profile of a user equipment, wherein the channel access profile is based on an active user equipment contexts including serving-cell contexts of the user equipment obtained by the cellular network during an active connection between the user equipment and the network;
synchronizing, by the network node, the channel access profile between the user equipment and the cellular network; and
performing at a subsequent time, by the network node while there is no active connection between the user equipment and the cellular network, a connection establishment procedure for a machine type communication to establish a connection between the user equipment and the cellular network based on the synchronized channel access profile, wherein the connection establishment procedure comprises performing bearer setup and resource allocation on the basis of the channel access profile of the user equipment.

16. The method of claim 15, wherein the channel access profile comprises at least one of equipment identities, serving-cell identities and system information, time and status of a previous cellular network connection, timing advance information, transmit power used during a previous cellular network connection, and channel allocation information.

17. The method of claim 15, wherein the channel comprises information on a traffic channel utilized by the user equipment.

18. The method of claim 15, further comprising: specifying a pre-determined set of channels for machine type communication traffic.

19. The method of claim 15, further comprising:
keeping a random number generator synchronized with a random number generator kept by user equipment configured to utilize machine type communication with the cellular network, storing information on the latest generated number and pre-configured PIN code, and generating a ciphering key utilizing the generator, and the PIN code, and forwarding the generated ciphering key to the cellular network for encrypting and decrypting data transmitted between the cellular network and the user equipment.

20. A computer program embodied on a non-transitory computer readable medium, comprising program instructions which, when loaded into an electronic apparatus, control the apparatus to:
retrieve, by a network node from a cellular network a channel access profile of a user equipment, where the channel access profile is based on active user equipment contexts including serving-cell contexts of the device obtained during an active connection between the user equipment and the cellular network;
synchronize, by the network node, the channel access profile between the user equipment and the cellular network; and
perform at a subsequent time by the network node while there is no active connection between the user equipment and the cellular network, a connection establishment procedure for a machine type communication to establish a connection between the user equipment and the cellular network based on the synchronized channel access profile, wherein the connection establishment procedure comprises performing bearer setup and resource allocation on the basis of the channel access profile of the user equipment.

21. The apparatus of claim 1, wherein the connection establishment procedure comprises using a bearer setup and resource allocation of a channel access profile for the user equipment stored at the network node to avoid using a random access channel procedure for the connection establishment.

22. The apparatus of claim 1, wherein the channel access profile comprises an index identifying a channel pre-allocated to the subsequent machine type communication.

* * * * *